United States Patent
Xiong et al.

(10) Patent No.: US 10,725,796 B2
(45) Date of Patent: Jul. 28, 2020

(54) ROBOT TASK MANAGEMENT METHOD, ROBOT USING THE SAME AND NON-TRANSITORY COMPUTER READABLE STORAGE MEDIUM

(71) Applicant: UBTECH Robotics Corp, Shenzhen (CN)

(72) Inventors: Youjun Xiong, Shenzhen (CN); Ruiqiang Huang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 6 days.

(21) Appl. No.: 16/223,138

(22) Filed: Dec. 18, 2018

(65) Prior Publication Data

US 2019/0205145 A1    Jul. 4, 2019

(30) Foreign Application Priority Data

Dec. 28, 2017   (CN) .......................... 2017 1 1471799

(51) Int. Cl.
*G06F 9/448*    (2018.01)
*G06F 16/903*   (2019.01)
*G06F 9/455*    (2018.01)

(52) U.S. Cl.
CPC ........ *G06F 9/4498* (2018.02); *G06F 9/45512* (2013.01); *G06F 16/90335* (2019.01); *G05B 2219/40089* (2013.01); *G05B 2219/40391* (2013.01)

(58) Field of Classification Search
CPC ............ G06F 9/4498; G06F 16/90335; G06F 9/45512; G05B 2219/40089; G05B 2219/40391
See application file for complete search history.

(56) References Cited

U.S. PATENT DOCUMENTS

| | | | | |
|---|---|---|---|---|
| 4,638,445 A | * | 1/1987 | Mattaboni | B25J 19/021 701/23 |
| 5,495,409 A | * | 2/1996 | Kanno | G06K 9/68 700/79 |
| 6,452,348 B1 | * | 9/2002 | Toyoda | B25J 13/003 318/3 |
| 8,380,652 B1 | * | 2/2013 | Francis, Jr. | B25J 9/1661 706/48 |
| 8,452,451 B1 | * | 5/2013 | Francis, Jr. | B25J 9/1658 700/245 |
| 9,050,723 B1 | * | 6/2015 | Elazary | G06F 11/0793 |
| 10,518,407 B2 | * | 12/2019 | Williams | B25J 9/08 |
| 2003/0045203 A1 | * | 3/2003 | Sabe | G06N 3/008 446/356 |

(Continued)

*Primary Examiner* — Shen Shiau (57) ABSTRACT

The present disclosure provides a task management method for a robot, a robot using the same, and a computer readable storage medium. The method includes: obtaining a current task of the robot, in response to receiving a request for executing a new task of the robot; querying the preset state table according to the new task and the current task to determine whether to switch the robot from the current task to the new task: and switching the robot from the current task to the new task, in response to determining to switch. In this way, the stability of the operation of the robot can be improved, and the efficiency of the robot to execute tasks can be improved.

11 Claims, 6 Drawing Sheets

(56) References Cited

U.S. PATENT DOCUMENTS

| | | | |
|---|---|---|---|
| 2003/0066050 A1* | 4/2003 | Wang | G05B 19/045 717/105 |
| 2005/0065651 A1* | 3/2005 | Ayers | F03G 7/065 700/245 |
| 2006/0195226 A1* | 8/2006 | Matsukawa | B25J 9/162 700/245 |
| 2006/0276934 A1* | 12/2006 | Nihei | B25J 9/1679 700/245 |
| 2008/0163094 A1* | 7/2008 | Pannese | G03F 7/70525 715/772 |
| 2009/0254217 A1* | 10/2009 | Pack | G06N 3/008 700/246 |
| 2009/0306823 A1* | 12/2009 | Baltes | G05D 1/0274 700/245 |
| 2014/0012415 A1* | 1/2014 | Benaim | G06F 30/00 700/248 |
| 2014/0365258 A1* | 12/2014 | Vestal | G06Q 10/063114 705/7.15 |
| 2015/0367513 A1* | 12/2015 | Gettings | B25J 9/0084 700/248 |
| 2016/0121487 A1* | 5/2016 | Mohan | H04L 67/34 700/248 |
| 2016/0129590 A1* | 5/2016 | Guerin | B25J 9/163 700/254 |
| 2016/0236869 A1* | 8/2016 | Kimura | G05D 1/0291 |
| 2016/0275092 A1* | 9/2016 | Black | G06F 3/0484 |
| 2017/0008174 A1* | 1/2017 | Rosen | B25J 9/1694 |
| 2017/0120446 A1* | 5/2017 | Veltrop | B25J 9/163 |
| 2018/0043532 A1* | 2/2018 | Lection | B25J 9/1661 |
| 2018/0218185 A1* | 8/2018 | High | G06F 16/90335 |
| 2018/0257228 A1* | 9/2018 | Tingler | B25J 9/1669 |
| 2018/0345494 A1* | 12/2018 | Hedlund | B25J 9/1664 |
| 2019/0054631 A1* | 2/2019 | Govindarajan | B25J 13/00 |
| 2019/0248007 A1* | 8/2019 | Duffy | B25J 5/007 |
| 2019/0378019 A1* | 12/2019 | Scheutz | G06N 5/02 |

* cited by examiner

ROBOT TASK MANAGEMENT METHOD, ROBOT USING THE SAME AND NON-TRANSITORY COMPUTER READABLE STORAGE MEDIUM

CROSS REFERENCE TO RELATED APPLICATIONS

This application claims priority to Chinese Patent Application No. 201711471799.2, filed Dec. 28, 2017, which is hereby incorporated by reference herein as if set forth in its entirety.

BACKGROUND

1. Technical Field

The present disclosure relates to robot technology, and particularly to a task management method for a robot, a robot using the same, and a computer readable storage medium.

2. Description of Related Art

With the development of robot technology, the application fields of robots is also expanding, the tasks of robots are becoming more and more diverse, and the complexity of tasks is also becoming higher and higher, which result in more and more complicated tasks and state controls of robots.

However, the inventor of the present disclosure found in the long-term research and development work that at present, since the system of a robot is composed of Android and ROS (robot operating system) interface, the execution of tasks is not only cross-process but also cross-system, and if the tasks are not managed unitedly, the robot is very prone to state disorders such as performing navigation during dancing, which reduces the stability of the system of the robot and reduces the efficiency of the robot to execute tasks.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

Figure 1:
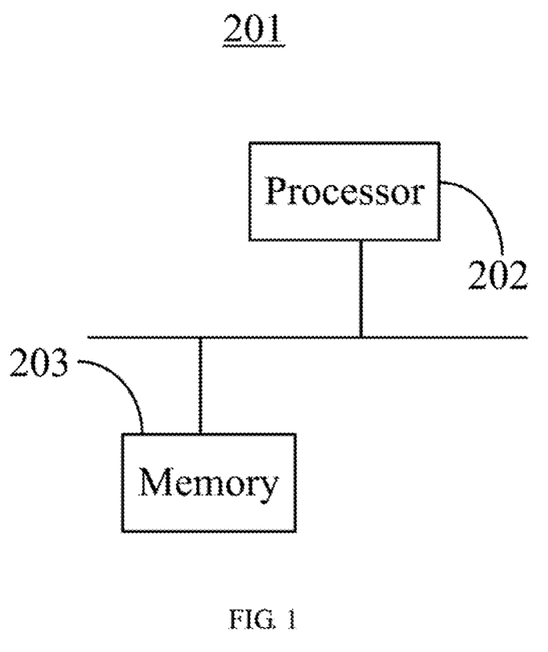
FIG. 1 is a schematic block diagram of the structure of a robot according to an embodiment of the present disclosure.

The present disclosure provides a robot. FIG. 1 is a schematic block diagram of the structure of a robot according to an embodiment of the present disclosure. As shown in FIG. 1, a robot 201 includes a processor 202 and a memory 203. In which, the processor 202 is configured to execute the state machine 302. The memory 203 is configured to store a preset state table. The memory 203 is further configured to store one or more computer programs which are executable on the processor 202, where the one or more computer programs include instructions for: obtaining a current task of the robot 201, if a request for a new task of the robot 201 is received; querying the preset state table stored in the memory 203 according to the new task and the current task to determine whether to switch the robot 201 from the current task to the new task; and transiting a state of the state machine 302 and switching the robot 201 from the current task to the new task, if determined to switch.

Figure 2:
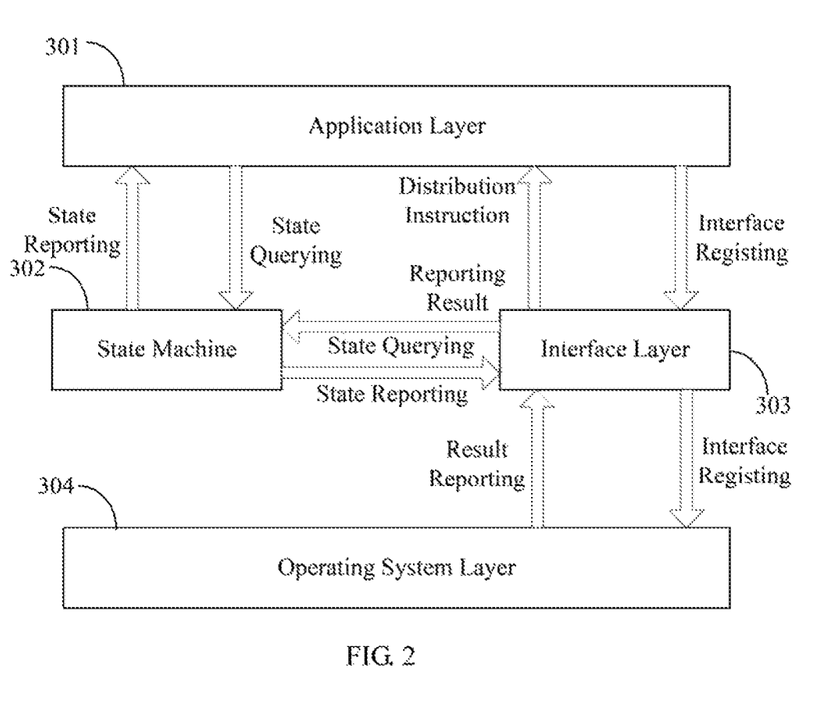
FIG. 2 is a schematic block diagram of a logical structure of the robot of FIG. 1.

FIG. 2 is a schematic block diagram of a logical structure of the robot of FIG. 1. As shown in FIG. 2, the robot 201 includes an application layer 301, a state machine 302, an interface layer 303, and an operating system layer 304 in a view of logical structure. The processor 202 and the memory 203 compose a hardware structure of the robot 201, and the application layer 301, the state machine 302, the interface layer 303, and the operating system layer 304 compose a software structure of the robot 201. The hardware structure is a carrier and platform for executing the software structure. In one embodiment, the application layer 301, the state machine 302, the interface layer 303, and the operating system layer 304 are programs stored in the memory 203 and executable on the processor 202.

In this embodiment, the application layer 301 executes various application programs under the control of the processor 202 to control the robot 201 to execute tasks to perform operations such as software upgrading, remote control, video service, navigation, and dancing, in which each task corresponds to each operation. When the application layer 301 receives the request for the new task, which requests the operating system layer 304 for configurations such as resources through the interface layer 303.

In this embodiment, the state machine 302 is configured to manage state of the robot 201, so as to enable the robot 201 to flexibly switch states. The state machine 302 performs state transition under the control of the processor 202, and feeds back the updated state to the application layer 301, so that the application layer 301 can execute a new task corresponding to the updated state, and at the same time, the processor 202 controls the state machine 302 to feed back the updated status to the interface layer 303; the processor 202 controls the operating system layer 304 to receive a request through the interface layer 303 and generate a reporting result according to the request; the processor 202 controls the is layer 303 to generate a distribution instruction according to the reporting result and the state of the state machine; and the processor 202 controls the application layer 301 to switch the robot 201 from the current task to the new task according to the distribution instruction.

In this embodiment, ate operating system layer 304 includes an ROS (robot operating system) interface and an Android system. In other embodiments, the operating system layer 304 may be other single operating system or other multiple operating systems.

If it is determined according to the above-mentioned preset state table that the robot is to be switched from the current task to the new task, the processor 202 controls the state machine 302 to transit from a current state corresponding to the current task to a target state corresponding to the new task, and controls the application layer 301 to switch from the current task to the new task.

In this embodiment, the switching from the current task to the new task is implemented by interrupting the current task and executing the new task, and resuming the current task after the new task terminates.

In other embodiments, the switching from the current task to the new task can be implemented by terminating the current task and executing the new task, and executing the next task after the new task completes.

Different from the prior art, this embodiment can perform all orderly management on the execution relationship between the current task and the new task by querying the preset state table. Therefore, the stability of the operation of the robot 201 can be improved, and the efficiency of the robot 201 to execute tasks can be improved.

If it is determined according to the above-mentioned preset state table that not to switch the robot from the current task to the new task, the processor 202 controls the state machine 302 to activate the target state corresponding to the new task, and controls the application layer 301 to perform the current task and the new task in parallel.

In this embodiment, tasks of the robot 201 is stored in a task list of the memory 203, and when the robot 201 operates, each task in the task list is sequentially executed in accordance with a state transition order of the state machine 302.

In this embodiment, the processor 202 determines whether the new task received by the application layer 301 is allowed to be added into the task list according to the preset state table. If so, the processor 202 added the new task to the task list, so that the application layer 301 can access the new task subsequently; otherwise, the processing 202 controls the application layer 301 to cancel the request for the new task.

Figure 3:
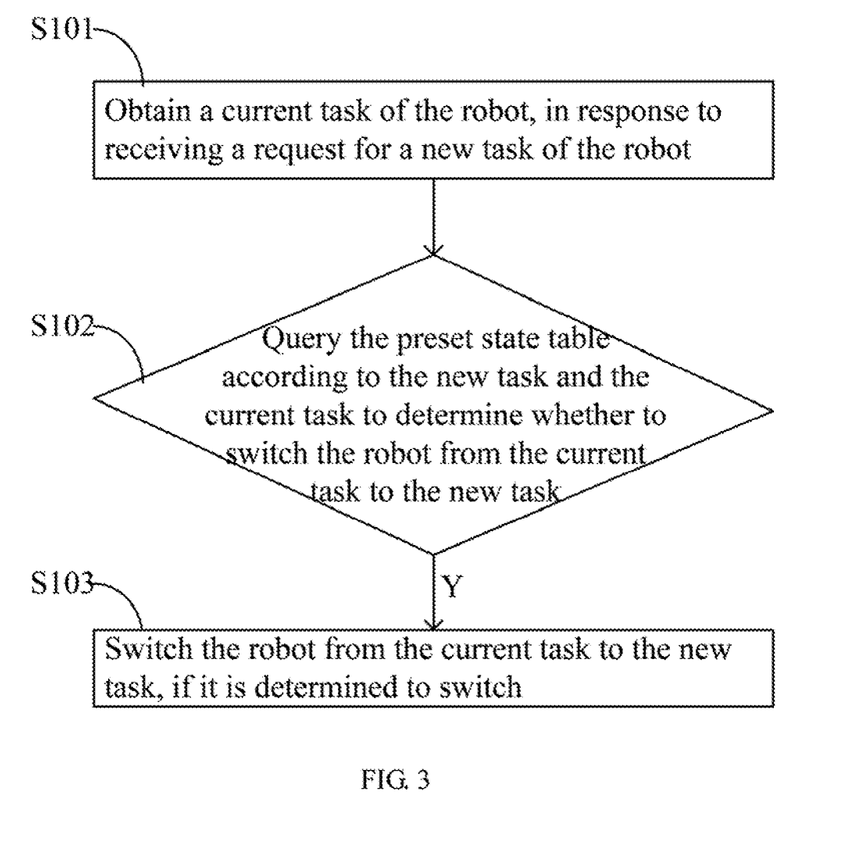
FIG. 3 is a flow chart of a first embodiment of a task management method according to the present disclosure.

The present disclosure further provides a task management method. FIG. 3 is a flow chart of a first embodiment of a task management method according to the present disclosure. In this embodiment, a task management method for a robot 201 is provided. The robot 201 executes a task according to a task list. In this embodiment, the method is a computer-implemented method executable for a processor, which may be implemented through a task management apparatus for a robot executing a task according to a task list. As shown in FIG. 3, the method includes the following steps.

S101: obtaining a current task of the robot, in response to receiving a request for executing a new task of the robot.

In which, the robot 201 includes a computing device, which includes a processor 202 and a memory 203. As shown in FIG. 1, a robot 201 includes a processor 202 and a memory 203, in which the processor 202 and the memory 203 composes a hardware structure of the robot 201. As shown in FIG. 2, an application layer 301, a state machine 302, an interface layer 303, and an operating system layer 304 composes a software structure of the robot 201. The hardware structure is a carrier and platform for executing the software structure. In one embodiment, the application layer 301, the state machine 302, the interface layer 303, and the operating system layer 304 are programs stored in the memory 203 and executable on the processor 202.

In this embodiment, the application layer 301 of is configured to perform information processing, which executes various application programs under the control of the processor 202 to control the robot 201 to execute tasks to perform operations such as software upgrading, remote control, video service, navigation, and dancing, in which each task corresponds to each operation. For example, the processor 202 controls the application layer 301 to execute application programs for software upgrading, remote control, video service, navigation, dancing, or the like, so as to make the robot 201 to perform corresponding operations, that is, software upgrading, remote control, video service, navigation, dancing, or the like, by executing a corresponding task.

In this embodiment, the state machine 302 is configured to manage states of the robot 201, which enables the robot 201 to flexibly switch states. A state machine can be described as a directed graph, which is consisted of a set of nodes and a set of corresponding transfer functions. The state machine "operates" by responding to a series of events. Each event is within the control range of the transfer function belonging to the "current" node, where the scope of the function is a subset of the nodes. The function returns the "next" (maybe the same) node. At least one of these nodes must be a final state. When the final state is reached, the state machine stops. The state machine 302 performs state transition under the control of the processor 202, and feeds back the updated state t the application layer 301, so that the application layer 301 can execute a new task corresponding to the updated state, and at the same time, the state machine 302 feeds back the updated status to the interface layer 303, such that the interface layer 303 to generate a distribution instruction based on the updated status and a reporting result of the operating system layer 304. In which, the distribution instruction is for controlling the new task.

In this embodiment, the operating system layer 304 includes an ROS (robot operating system) interface and an Android system. In other embodiments, the operating system layer 304 may be other single operating system or other multiple operating systems.

If the application layer 301 receives a request for a new task, the processor 202 obtains a current task of the robot 201. When the application layer 301 receives a request for the new task, which requests the operating system layer 304 for configurations such as resources through the interface layer 303.

S102: querying the preset state table according to the new task and the current task to determine whether to switch the robot from the current task to the new task; if yes, step S103 is executed.

In this embodiment, the processor 202 queries the preset state table according to the new task and the current task to determine whether to switch the robot from the current task to the new task.

In which, the preset state table is stored in the memory 203. In this embodiment, the preset state tables as shown in Table 1:

TABLE 1

Preset State Table

| State Value | Current State | Next State | | | |
| --- | --- | --- | --- | --- | --- |
| | | Remote Control | System Upgrade | Boot Config-uration | Emergency Stop |
| 0 | Remote Control | N/A | 2 | N/A | 2 |
| 11 | System Upgrade | 0 | N/A | N/A | 1 |
| 20 | Boot Configuration | 0 | 2 | N/A | 1 |
| 15 | Emergency Stop | 0 | 2 | N/A | N/A |

In which, in the preset state table, the "next state" corresponds to the new task received by the application layer 301, and the "current state" corresponds to the current task executed by the application layer 301. The preset state table includes an execution relationship between tasks (each corresponds to a state) of the robot 201, in which the execution relationship includes: insertion prohibited (indicated by "0"), entered and coexisted (indicated by "1"), and entered and interrupted (indicated by "2"), and the like. The insertion prohibited means that the new task cannot interrupt the current task. For example, the execution relationship between the new task of remote control and the current task of system upgrade is "0", which means that the remote control cannot interrupt the system upgrade; the execution relationship between the nest task of emergency stop and the current task of system upgrade is "1", which means that the emergency stop and the system upgrade can be executed in parallel; the execution relationship between the new task of system upgrade and the current task of boot configuration is "2", which means that the system upgrade can be executed after the boot configuration is interrupted.

In other embodiments, the tasks of the robot 201 are not limited to the tasks shown in Table 1, and may also include video communication, greeting, advertising, automatic parade, gossip, video playing, music playing, and the like. The relationship between the tasks is also not limited to the relationship shown in Table 1, and the user can update and supple Table 1 by actual needs.

In this embodiment, each state can be identified by a state value. For example, the state value "20" represents a boot configuration.

S103: switching the robot from the current task to the new task.

If it is determined according to the above-mentioned preset state table that the robot is to be switched from the current task to the new task, the processor 202 controls the state machine 302 to transit from a current state corresponding to the current task to a target state corresponding to the new task, and controls the application layer 301 to switch from the current task to the new task. For example, by querying the above-mentioned preset state table, the execution relationship between the new task of system upgrade and the current task of remote control is "2", which means that the remote control is allowed to be interrupted by the system upgrade, and the processor 202 controls the application laser 301 to switch from the remote control to the system upgrade.

In this embodiment, the switching front the current task to the new task is implemented by interrupting the current task and executing the new task, and resuming the current task after the new task terminates.

In other embodiments, the switching from the current task to the new task can be implemented by terminating the current task and executing the new task, and executing the next task after the new task completes.

Different from the prior art, this embodiment can perform an orderly management on the execution relationship between the current task and the new task by querying the preset state table. Therefore, the stability of the operation of the robot 201 can be improved, and the efficiency of the robot 201 to execute tasks can be improved.

Figure 4:
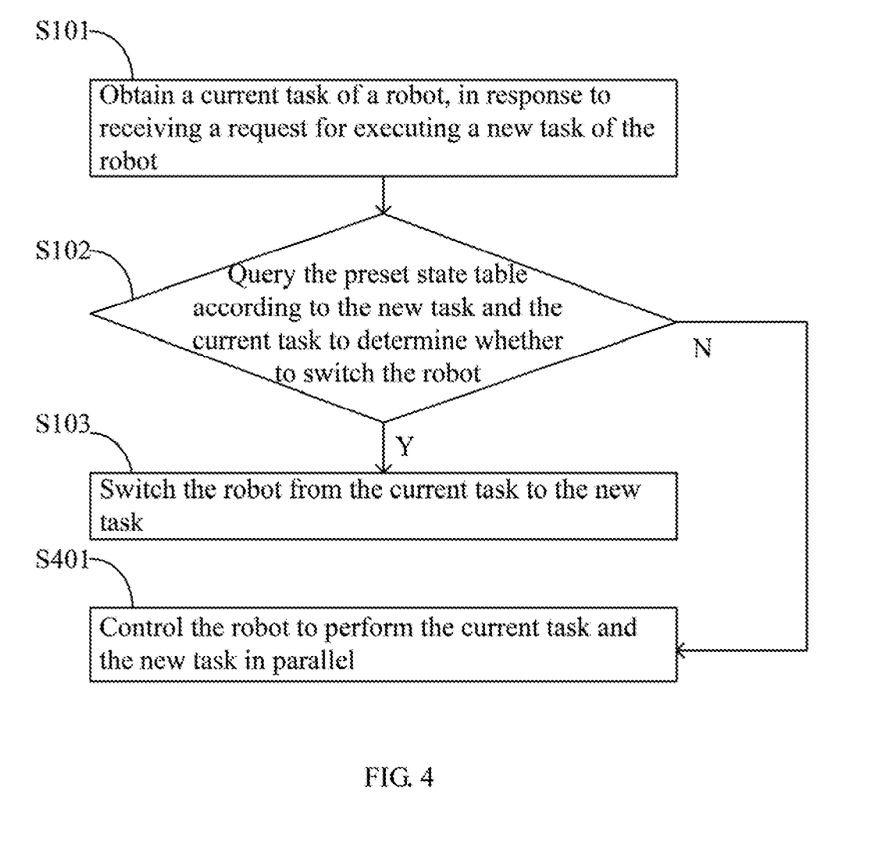
FIG. 4 is a flow chart of a second embodiment of a task management method according to the present disclosure.

The present disclosure further provides a task management method based on the above-mentioned first embodiment. FIG. 4 is a flow chart of a second embodiment of a task management method according to the present disclosure. As shown in FIG. 4, based on the method of the above-mentioned embodiment, the method further includes the following steps.

S401: controlling the robot 201 to perform the current task and the new task parallel, if it is determined not to switch the robot from the current task to the new task If it is determined according to the above-mentioned preset state table that not to switch the robot from the current task to the new task, the processor 202 controls the state machine 302 to activate the target state corresponding to the new task, and controls the application layer 301 to perform the current task and the new task in parallel. For example, by querying the preset state table, the execution relationship between the new task of emergency stop and the current task of boot configuration of "1" is obtained, which means that the emergency stop and the boot configuration are performed in parallel, and the processor 202 controls the application layer 101 to perform the emergency stop and the boot configuration in parallel.

Figure 5:
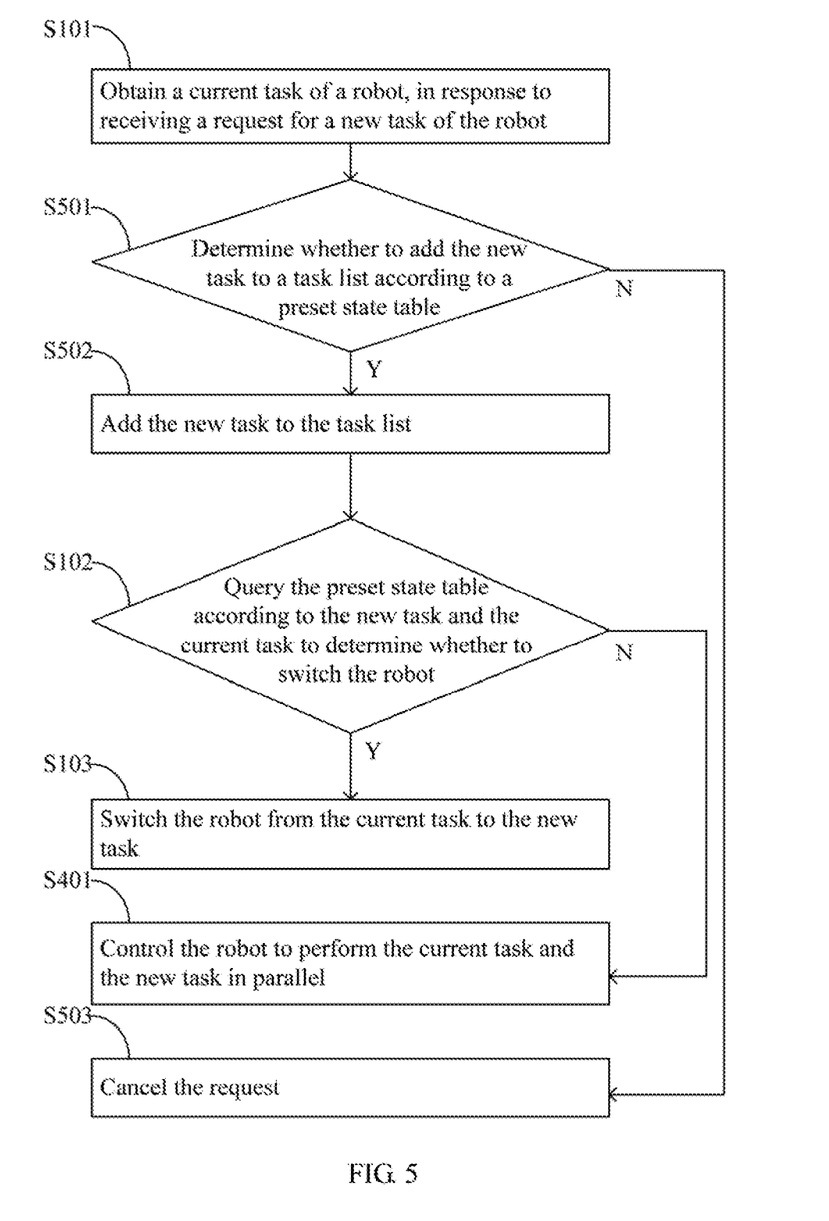
FIG. 5 is a flow chart of a third embodiment of a task management method according to the present disclosure.

The present disclosure further provides a task management methobased on the above-mentioned second embodiment. FIG. 5 is a flow chart of a third embodiment of a task management method according to the present disclosure. As shown in FIG. 5, in this embodiment, tasks of the robot 201 are stored in a task list of the memory 203, and when the robot 201 operates, each task in the task list is sequentially executed in accordance with a state transition order of the state machine 302.

In this embodiment before step S102 of the method of the above-mentioned embodiment, the method of this embodiment further includes the following steps.

S501: determining whether to add the new task to the task list according to a preset state table; if yes, step S502 is executed; if no, step S503 is executed.

S502: adding the new task to the task list.

S503: cancelling the new task request.

In this embodiment, the processor 202 determines whether the new task received by the application layer 301 is allowed to be added into the task list according to the preset state table. If so, the new task is added to the task list, so that the application layer 301 can call the new task subsequently, for example, by querying the preset state table, the execution relationship between the new task of emergency stop and the current task of boot configuration of "1" that is, not "0", is obtained, and the processor 202 adds the emergency stop into the task list. Otherwise, the processing 202 controls the application layer 301 to cancel the request for the new task. For example, by querying the preset state table, the execution relationship between the new task of remote control and the current task of boot configuration of "0" is obtained, which means that the remote control is not allowed to interrupt the boot configuration, and the processor 202 controls the application layer 301 to cancel the request of the remote control.

As shown in FIG. 2, in the following, the logical structure of the task management method for the robot is described in detail. Specifically: 1) if the application layer 301 receives a request for a new task, a first state query is performed according to a preset state table first so as to determine whether to add the new task into the task list, the state machine 302 reports the first query result (i.e., the state obtained by querying) to the application layer 301, if yes, the new task is added into the task list, and if no, the request for the new task is cancelled, where the step implements the same function as that of the above-mentioned steps S501-S503; 2) if the new task is added into the task list, the application layer 301 sends an interface registration request to the interface layer 303 according to the new task, and at this time, the interface layer 303 performs a second status query according to the preset state table so as to determine whether the new task is allowed to interrupt the current task, or has to be performed in parallel with the current task, the state machine 302 reports the second query result (i.e., the state obtained by querying) to the interface layer 303, and the interface layer 303 sends an interface registration request to the operating system layer 304 according to the new task and the second query result; 3) the operating system layer 304 generates a reporting result according to the interface registration request, where the reporting result at least includes resource allocation information for the new task; 4) the interface layer 303 generates a distribution instruction based on the structure of the report and the second query result, so as to control the application layer 301 to interrupt the current task and execute the new task, or control the application layer 301 to perform the current task and the new task in parallel, where the steps 2)-4) implement the same function as that of the above-mentioned steps S101-S103 and S401.

Figure 6:
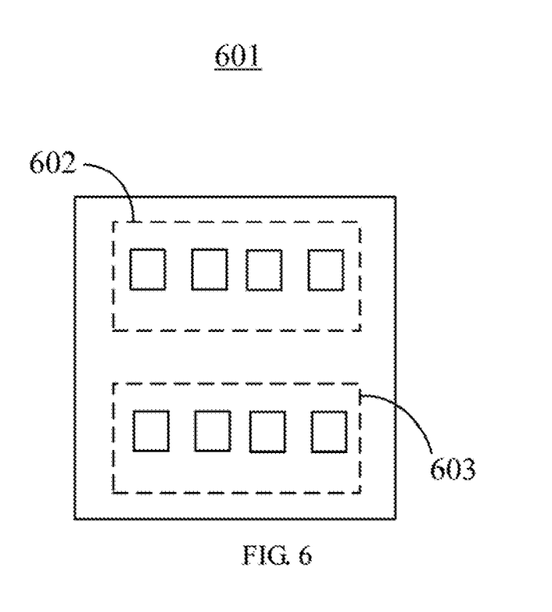
FIG. 6 is a schematic block diagram of the structure of a computer readable storage medium according to an embodiment of the present disclosure.

The present disclosure further provides a computer readable storage medium. FIG. 6 is a schematic block diagram of the structure of a computer readable storage medium according to an embodiment of the present disclosure. As shown in FIG. 6, a storage medium 601 is configured to store related data 602 and program data 603 of the above-mentioned embodiments. In which, the related data 602 at least includes the above-mentioned preset state table, task list, and the like, the program data 603 can be executed to implement the method of the above-mentioned embodiments. The related data 602 and the program data 603 have been described in detail in the above-mentioned method embodiments, and are not described herein.

In this embodiment, the storage medium 601 may be, but is not limited to, a USB flash drive, an SD card, a PD optical drive, a mobile hard disk, a large-capacity floppy disk drive, a flash memory, a multimedia memory card, a server, and the like.

Different from the prior art, this embodiment can solve the problem of state disorder in across-process or across-system of the tasks of the robot 201. By querying the preset state table, the execution relationship between the current task and the new task can be managed in an orderly manner. Therefore, the stability of the operation of the robot 201 can be improved, and the efficiency of the robot 201 to execute tasks can be improved.

In addition, if the above-mentioned functions are implemented in the form of software functions and sold or used as stand-alone products, they may be stored in a computer readable storage medium for a mobile terminal, that is, the present disclosure further provides a storage device storing program data. The program data can be executed to implement the method of the above-mentioned embodiment, and the storage device can be, for example, a USB flash drive, an optical disk, a server, or the like. That is, the present disclosure can be implemented in the form of a software product that includes a plurality of instructions for making a smart terminal to perform all or part of the steps of the methods described in each of the embodiments.

In the descriptions of the present disclosure, the descriptions of the terms "one embodiment", "some embodiments", "example", "specific examples", or "some examples" and the like are intended to mean that the specific features, structures, materials, or characteristics which described with the embodiment or example is included in at least one embodiment or example of the present disclosure. In this specification, the schematic representation for the above-mentioned terms is not necessarily specific to the same embodiment or example. Furthermore, the described particular features, structures, materials, or characteristics may be combined in a suitable manner in any one or more embodiments or examples. In addition, different embodiments or examples described in the specification and features of different embodiments or examples may be combined and assembled.

Moreover, the terms "first" and "second" are merely used for descriptive purposes and cannot be understood as indicating or implying a relative importance or implicitly indicating the number of the indicated technical features. Thus, the features defined with "first" or "second" may include at least one of the features, either explicitly or implicitly. In the description of the present disclosure, the meaning of "a plurality" is at least two, for example, two or three, unless specifically defined otherwise.

Any process or method in the flowcharts or otherwise described herein may be understood as a module, segment or portion of codes of executable instructions which includes one or more steps for implementing a particular logical function or process, and the scope of the preferred embodiments of the present disclosure includes additional implementations, in which the functions may be executed not in the shown or discussed order, for example, executed in a substantially simultaneous manner or in the reverse order based on the functions involved, which will be understood by those skilled in the art of the embodiments of the present disclosure.

The logics and/or steps described in the flowchart or otherwise herein, for example, may be considered as an ordered list of executable instructions for implementing logical functions, and may be implemented in any computer readable medium for use in an instruction execution system, device or apparatus (which may be a personal computer, server, network device, or other system that can obtain and execute instructions from an instruction execution system, device or apparatus) or for use in conjunction with an instruction execution system, device or apparatus. For this specification, a "computer readable medium" can be any device that can contain, store, communicate, propagate, or transmit a program for use an instruction execution system, device or apparatus or for use in conjunction with an instruction execution system, device or apparatus. More specific examples (non-exhaustive list) of computer readable media include: electrical connections (electronic devices) having one or more wires, portable computer disk cartridges (magnetic devices) random access memory (RAM), read only memory (ROM), erasable editable read only memory (EPROM), flash memory, optical fiber devices, servers, and compact disk read only memory (CDROM). In addition, the computer readable medium may even be a paper or other suitable medium on which the program can be printed, as it may perform optical scanning on, for example, paper or other medium, and edit, interpret or process in other suitable method if necessary, thereby obtaining the program in an electronical manner and storing it in a memory of a computer.

The forgoing is only the embodiments of the present disclosure, and is not intended to limit the scope of the present disclosure. The equivalent structure or equivalent process transformation using the specification and the drawings of the present disclosure, or direct or indirect application in other related technology fields, are all similarly included in the scope of the protection of the present disclosure.

What is claimed is:

1. A computer-implemented task management method for a robot executing a task according to a task list, comprising executing on a processor the steps of:
   obtaining a current task of the robot, in response to receiving a request for executing a new task of the robot;
   determining whether to, add the new task to the task list according to a preset state table;
   adding the new task to the task list in response to determining to add the new task;
   querying the preset state table according to the new task and the current task to determine whether to switch the robot from the current task to the new task; and
   switching the robot from the current task to the new task, in response to determining to switch.

2. The method of claim 1, further comprising:
   controlling the robot to perform the current task and the new task in parallel, in response to determining not to switch.

3. The method of claim 1, wherein the step of switching the robot from the current task to the new task comprises:
   interrupting the current task and executing the new task.

4. A robot executing a task according to a task list, comprising:
   a processor configured to execute a state machine;
   a memory configured to store a preset state table; and
   one or more computer programs stored in the memory and executable on the processor, wherein the one or more computer programs comprise:
   instructions for obtaining a current task of the robot, in response to receiving a request for executing a new task of the robot;
   instructions for determining whether to add the new task to the task list according to the preset state table;
   instructions for adding the new task to the task list in response to determining to add the new task;
   instructions for querying the preset state table according to the new task and the current task to determine whether to switch the robot from the current task to the new task; and
   instructions for transiting a state of the state machine and switching the robot from the current task to the new task, in response to determining to switch.

5. The robot of claim 4, wherein, the one or more computer programs further comprise:
   instructions for activating a state of the state machine corresponding to the new task, and controlling the robot to perform the current task and the new task in parallel, in response to determining not to switch.

6. The robot of claim 4, wherein the instructions for switching the robot from the current task to the new task comprise:
   instructions for interrupting the current task and executing the new task.

7. The robot of claim 4, wherein the one or more, computer programs further comprise:
   instructions for executing an operating system layer and an interface layer;
   instructions for controlling the state machine to report the status of the state machine to the interface layer;
   instructions for controlling the operating system layer to receive the request through the interface layer and generate a reporting result according to the request;
   instructions for controlling the interface layer to generate a distribution instruction according to the reporting result and the state of the state machine; and
   instructions for switching the robot from the current task to the new task according to the distribution instruction.

8. A non-transitory computer readable storage medium storing one or more computer programs, wherein the one or more computer programs comprise:
   instructions for obtaining a current task of the robot, in response to receiving a request for executing a new task of the robot:
   instructions for determining whether to add the new task to the task list according to the preset state table;
   instructions for adding the new task to the task list in response to determining to add the new task;
   instructions for querying the preset state table according to the new task and the current task to determine whether to switch the robot from the current task to the new task; and
   instructions for transiting a state of the state machine and switching the robot from the current task to the new task, in response to determining to switch.

9. The medium of claim 8, wherein, the one or more computer programs further comprise:
   instructions for activating a state of the state machine corresponding to the new task, and controlling the robot to perform the current task and the new task in parallel, in response to determining not to switch.

10. The medium of claim 8, wherein the instructions for switching the robot from the current task to the new task comprise:
    instructions for interrupting the current task and executing the new task.

11. The medium of claim 8, wherein the one or more computer programs further comprise:
    instructions for executing an operating system layer and an interface layer;
    instructions for controlling the state machine to report the status of the state machine to the interface layer;
    instructions for controlling the operating system layer to receive the request through the interface layer and generate a reporting result according to the request;
    instructions for controlling the interface layer to generate a distribution instruction according to the reporting result and the state of the state machine; and
    instructions for switching the robot from the current task to the new task according to the distribution instruction.

* * * * *